(12) United States Patent
Nakagawa et al.

(10) Patent No.: US 10,374,370 B2
(45) Date of Patent: Aug. 6, 2019

(54) ELECTRONIC UNIT ATTACHING STRUCTURE

(71) Applicant: Yazaki Corporation, Tokyo (JP)

(72) Inventors: Takuya Nakagawa, Makinohara (JP); Koki Sato, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/046,326

(22) Filed: Jul. 26, 2018

(65) Prior Publication Data

US 2019/0052028 A1  Feb. 14, 2019

(30) Foreign Application Priority Data

Aug. 8, 2017  (JP) ................. 2017-153464

(51) Int. Cl.
| | |
|---|---|
| *H01R 13/518* | (2006.01) |
| *H01R 13/73* | (2006.01) |
| *H01R 27/02* | (2006.01) |
| *H01H 85/00* | (2006.01) |
| *B60R 16/023* | (2006.01) |
| *H01R 13/193* | (2006.01) |
| *H01R 13/631* | (2006.01) |
| *H01R 13/627* | (2006.01) |

(52) U.S. Cl.
CPC ......... *H01R 13/73* (2013.01); *B60R 16/0238* (2013.01); *H01H 85/00* (2013.01); *H01R 13/518* (2013.01); *H01R 27/02* (2013.01); *H01R 13/193* (2013.01); *H01R 13/6273* (2013.01); *H01R 13/6315* (2013.01); *H01R 2201/26* (2013.01); *Y10S 439/9241* (2013.01)

(58) Field of Classification Search
CPC .............. H01R 13/193; H01R 13/6315; Y10S 439/9241
See application file for complete search history.

(56) References Cited

U.S. PATENT DOCUMENTS

| | | | |
|---|---|---|---|
| 5,344,347 A | | 9/1994 | Inoue et al. |
| 5,913,703 A | * | 6/1999 | Suzuki ................. H01R 13/518 |
| | | | 439/489 |

(Continued)

FOREIGN PATENT DOCUMENTS

| | | |
|---|---|---|
| JP | 6-111882 A | 4/1994 |
| JP | 11-54210 A | 2/1999 |

(Continued)

*Primary Examiner* — Tho D Ta
(74) *Attorney, Agent, or Firm* — Sughrue Mion, PLLC

(57) ABSTRACT

An electronic unit attaching structure includes an electronic unit (30) having a plurality of connector connection portions (33, 34) and an electronic unit attachment (20) having a plurality of connectors (C1, C2) correspond to the plurality of the connector connection portions. The electronic unit attaching structure is configured to allow first connection and second connection in this order when the electronic unit (30) is attached to the electronic unit attachment (20). The first connection is a connection of first part (C2) of the plurality of the connectors with first part (34) of the plurality of the connector connection portions. The second connection is a connection of second part (C1) of the plurality of the connectors with second part (33) of the plurality of the connector connection portions.

4 Claims, 3 Drawing Sheets

(56) References Cited

U.S. PATENT DOCUMENTS

| | | | | |
|---|---|---|---|---|
| 6,666,728 B2* | 12/2003 | Tachi | ................... | H01R 13/193 |
| | | | | 439/248 |
| 7,217,150 B2* | 5/2007 | Lekic | ................. | H01R 13/6273 |
| | | | | 439/352 |
| 7,934,939 B2* | 5/2011 | Chen | ................... | H01R 13/639 |
| | | | | 439/352 |
| 8,672,696 B2* | 3/2014 | Sakurai | ............. | H01R 13/6315 |
| | | | | 439/247 |

FOREIGN PATENT DOCUMENTS

| JP | 2002-34131 A | 1/2002 |
|---|---|---|
| JP | 2015-8571 A | 1/2015 |

* cited by examiner

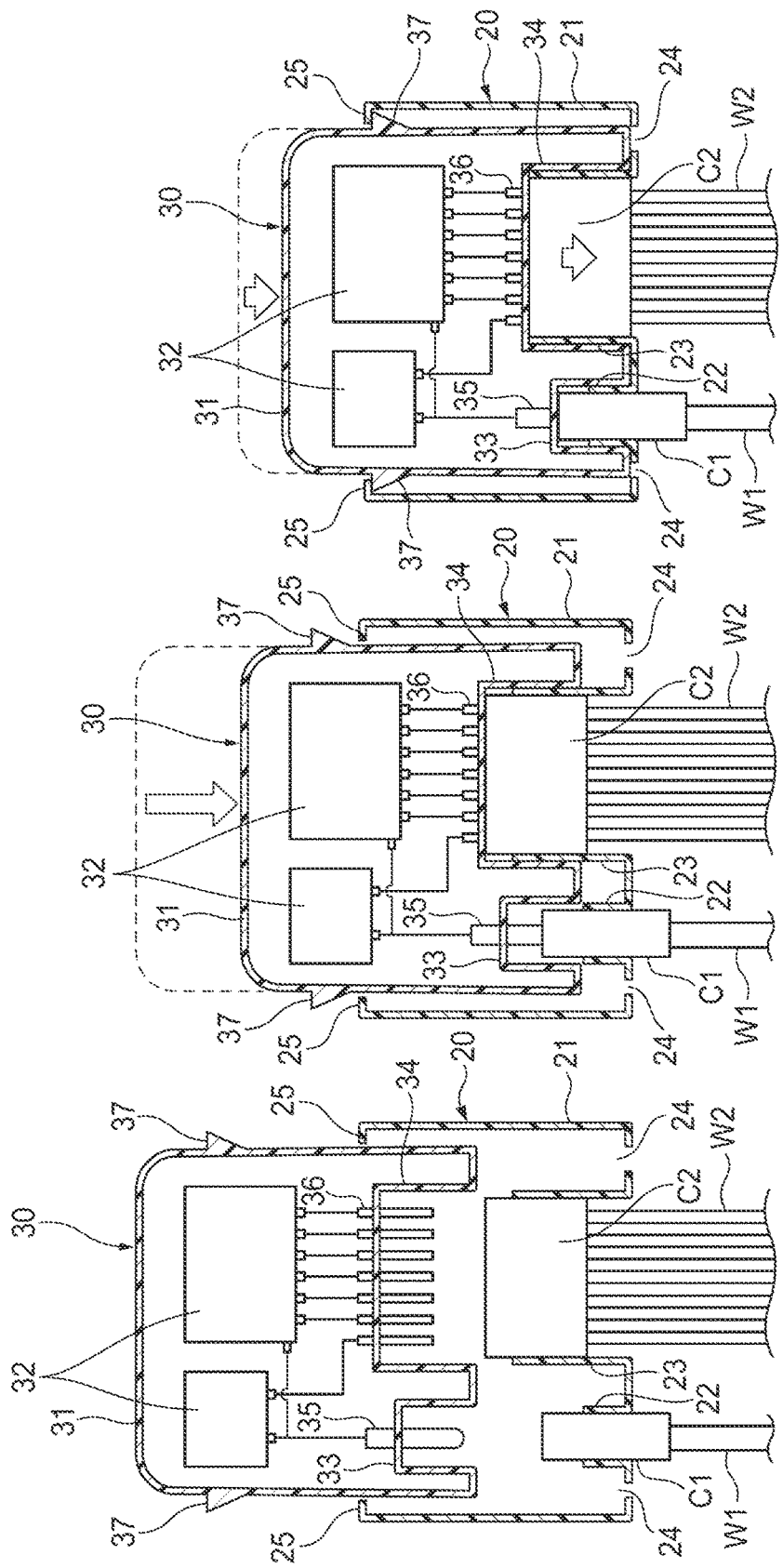

ELECTRONIC UNIT ATTACHING STRUCTURE

CROSS-REFERENCES TO RELATED APPLICATION(S)

This application is based on and claims priority from Japanese Patent Application No. 2017-153464 filed on Aug. 8, 2017, and the entire contents of which are incorporated herein by reference.

BACKGROUND

Field of the Invention

The present invention relates to an electronic unit attaching structure.

Description of Related Art

Attaching structures for attaching an electronic unit incorporating semiconductor devices to, for example, a relay box of an automobile are known.

In one such conventional attaching structure, a connector in which end portions of electric wires leading from a relay box are inserted is attached to an electronic unit and then the electronic unit and the electric wires are attached to the relay box together.

As for details of the above connection structure, refer to JP 2015-008571 A, JP 06-111882A, JP 2002-034131 A and JP 11-054210 A.

SUMMARY

In the above conventional attaching structure, to attach an electronic unit to a relay box, it is necessary to execute a step of attaching a connector in which end portions of electric wires leading from the relay box are inserted to the electronic unit and a step of attaching the electronic unit and the electric wires to the relay box. Since these plural steps need to be executed, attaching work of the conventional attaching structure is complicated. It is desired to facilitate electronic unit attaching work and thereby make it possible to perform that work more efficiently.

An object of the invention is to provide an electronic unit attaching structure that facilitates electronic unit attaching work.

Embodiments of the present invention provide the following items (1) and (2):

(1) An electronic unit attaching structure comprising:
an electronic unit having a plurality of connector connection portions; and an electronic unit attachment having a plurality of connectors correspond to the plurality of the connector connection portions,
the electronic unit attaching structure being configured to allow first connection and second connection in this order upon the electronic unit being attached to the electronic unit attachment, the first connection being a connection of first part of the plurality of the connectors with first part of the plurality of the connector connection portions, the second connection being a connection of second part of the plurality of the connectors with second part of the plurality of the connector connection portions.

(2) The electronic unit attaching structure according to the item (1), wherein the electronic unit attaching structure is used at a location where the electronic unit is attached to an electric connection box to which a plurality of electronic components are attached.

According to first aspect of the invention, relating to the item (1), the plural connectors are attached to the electronic unit attachment in advance. Connection of the plural connectors to the electronic unit is completed by attaching the electronic unit to the electronic unit attachment. As a result, the number of work steps is smaller and the attaching work is easier accordingly than in the conventional attaching structure.

In the electronic unit attaching structure having the above configuration, the plural connectors are connected to the electronic unit with different timing. Thus, though the plural connectors are to be connected to the electronic unit, the force that is required for connection of the connectors is distributed in time. As a result, the maximum value of an external force that is necessary to attach the electronic unit to the electronic unit attachment can be made smaller and work of attaching the electronic unit to the electronic unit attachment can be made easier than in a case that all the plural connectors are connected at the same time. Furthermore, since an event that too strong a force acts on the electronic unit can be avoided, electronic components such as semiconductor devices provided in the electronic unit can be prevented from, for example, being affected unexpectedly by such a force.

The electronic unit attaching structure having the above configuration provides another advantage. In the conventional attaching structure, since the electric wires lead out of the relay box, the electric wires need to be elongated accordingly, resulting in weight increase of the relay box. In contrast, in the attaching structure having the above configuration, the electric wires need not be elongated for such a purpose. Thus, if the attaching structure having the above configuration is employed in, for example, a relay box, the weight of the relay box can be reduced.

According to second aspect of the invention, relating to the item (2), the electronic unit can be attached to the electric connection box that is limited in work space because a number of electronic components are mounted on it, without the need for routing electric wires out of the electric connection box as in the conventional attaching structure. As a result, work of attaching the electronic unit to the electric connection box can be performed efficiently.

The invention makes it possible to provide an electronic unit attaching structure that facilitates electronic unit attaching work.

Several aspects of the invention have been described briefly above. The further details of the invention will be made clearer if the following description is read through with reference to the accompanying drawings.

BRIEF DESCRIPTION OF THE DRAWINGS

FIGS. 3A-3C are sectional views, taken along line A-A in FIG. 2B, illustrating a procedure according to which the electronic unit is attached to an electronic unit attachment.

DETAILED DESCRIPTION

Embodiment

An electric connection box 10 in which an electronic unit attaching structure according to an embodiment of the present invention will be hereinafter described with reference to the drawings. The electric connection box 10 is also called a relay box. Typically, the electric connection box 10 is installed in a vehicle and used in a state that it is electrically connected to various vehicular electric devices.

Figure 1:
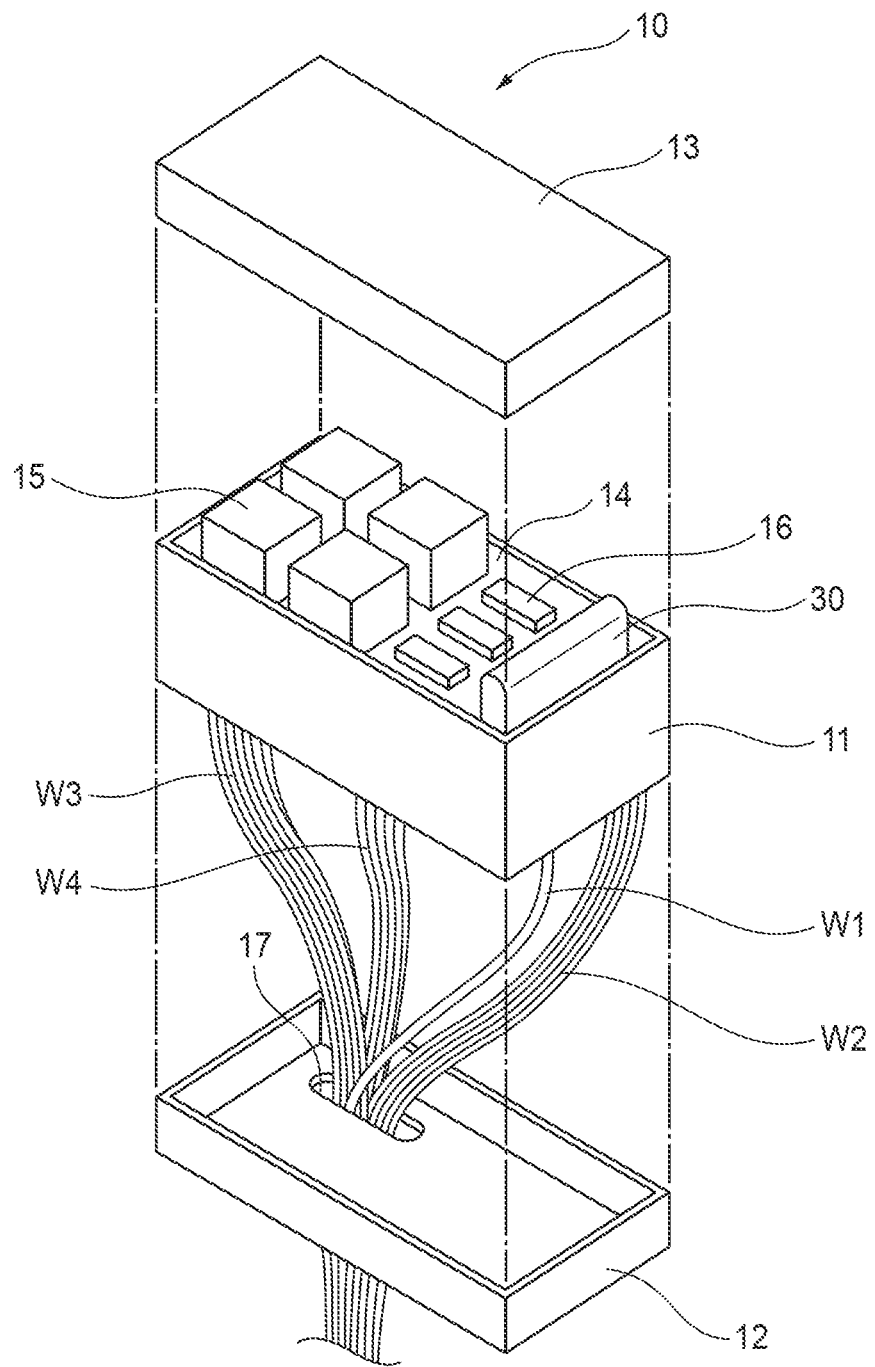
FIG. 1 is an exploded perspective view of an electric connection box that employs an electronic unit attaching structure according to an embodiment of the present invention.

First, the electric connection box 10 will be described with reference to FIG. 1. As shown in FIG. 1, the electric connection box 10 is equipped with a main body 11 which is made of a resin and shaped like a rectangular box that is open at the top and the bottom, a bottom cover 12 which is made of a resin and is attached to and cover the bottom edge of the main body 11, and a top cover 13 which is made of a resin and is attached to and cover the top edge of the main body 11.

Figure 2A:
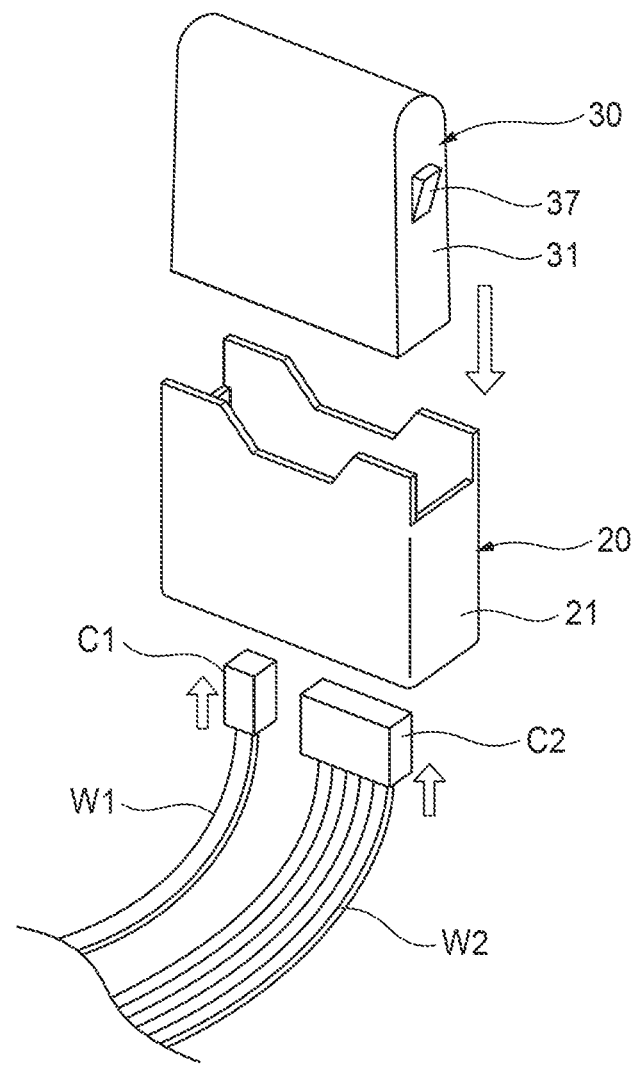
FIG. 2A is an exploded perspective view of the electronic unit attaching structure according to the embodiment of the invention.
Figure 2B:
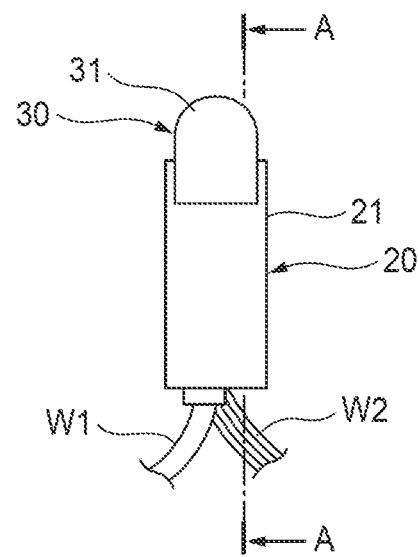
FIG. 2B is a side view of the electronic unit attaching structure in a state that attachment of an electronic unit is completed.

A board 14 is disposed inside and fixed to the main body 11, and plural (in the embodiment, four) relays 15 and plural (in the embodiment, three) fuses 16 are mounted on the top surface of the board 14. An electronic unit attachment 20 (see FIGS. 2A and 2B) having a box shape that is open at the top is disposed inside and fixed to the main body 11, and an electronic unit 30 (see FIGS. 2A and 2B) is inserted in and fixed to the electronic unit attachment 20. The electronic unit attachment 20 and the electronic unit 30 will be described later in detail.

A connector C1 (see FIG. 2A) which is connected to one end portion of a cable W1 and a connector C2 (see FIG. 2A) which is connected to one end portion of a cable W2 are connected to respective connector connection portions 33 and 34 (see FIGS. 3A-3C) which are formed in the bottom wall of the electronic unit 30. In the embodiment, the cable W1 is a single electric wire and the cable W2 is a bundle of plural electric wires. Thus, a single female terminal (not shown) connected to the cable W1 is provided in a terminal housing hole of the connector C1 and plural female terminals (not shown) connected to the plural respective electric wires of the cable W2 are provided in a terminal housing hole of the connector C2.

A connector (not shown) that is connected to one end portion of a cable W3 and a connector (not shown) that is connected to one end portion of a cable W4 are connected to two respective connector connection portions (not shown) that are mounted on the bottom surface of the board 14. In the embodiment, each of the cables W3 and W4 are a bundle of electric cables.

The cables W1-W4 are bundled together and routed downward through an opening 17 of the bottom cover 12. The other end portions of the cables W1-W4 are electrically connected to various vehicular electric devices, for example.

Next, the electronic unit attaching structure according to the embodiment of the invention will be described with reference to FIGS. 2A and 2B and FIGS. 3A-3C.

As shown in FIGS. 2A and 2B and FIGS. 3A-3C, the electronic unit attachment 20 has a body 21 which is made of a resin and is open at the top. Since the electronic unit 30 is to be inserted in the body 21, the internal space of the body 21 is shaped so as to conform to the external shape of the electronic unit 30.

As shown in FIGS. 3A-3C, connector attachment holes 22 and 23 penetrate through the bottom wall of the body 21 in the vertical direction so as to be surrounded by respective side walls that project upward. The connector attachment hole 22 is a hole for attachment of the connector C1 which is connected to the one end portion of the cable W1, and is shaped so as to conform to the external shape of the connector C1. Likewise, the connector attachment hole 23 is a hole for attachment of the connector C2 which is connected to the one end portion of the cable W2, and is shaped so as to conform to the external shape of the connector C2.

Drain holes (through-holes) 24 are formed through the bottom wall of the body 21 at plural positions that are different from positions where the connector attachment holes 22 and 23. A pair of lock nails 25 project from respective top edges, opposed to each other, of the body 21 in such directions as to come closer to each other.

The electronic unit 30 has a body 31 which is made of a resin and approximately shaped like a cuboid having a semicylindrical top portion. As shown in FIGS. 3A-3C, plural semiconductor devices 32 are provided inside the body 31. The connector connection portions 33 and 34 which are recessed upward are formed in the bottom wall of the body 31. The connector connection portion 33 is a recessed portion to which the connector C1 is to be connected, and is shaped so as to conform to the external shape of the connector C1. Likewise, the connector connection portion 34 is a recessed portion to which the connector C2 is to be connected, and is shaped so as to conform to the external shape of the connector C2.

A single male terminal 35 to be fitted with the single female terminal of the connector C1 projects downward from the bottom surface of the connector connection portion (recessed portion) 33, and plural male terminals 36 to be fitted with the plural respective female terminals of the connector C2 project downward from the bottom surface of the connector connection portion (recessed portion) 34. The male terminals 35 and 36 are electrically connected to the plural semiconductor devices 32. The external surfaces of the pair of side walls, opposed to each other, of the body 31 are formed with a pair of lock projections 37 in such a manner that they correspond to the pair of lock nails 25, respectively.

A procedure according to which the electronic unit 30 is attached to the electronic unit attachment 20 will be described below with reference to FIGS. 3A-3C. As described above, the electronic unit attachment 20 is set inside and fixed to the main body 11 of the electric connection box 10 in advance.

First, as shown in FIG. 3A, the connector C1 which is connected to the cable W1 is attached to the connector attachment hole 22 of the electronic unit attachment 20 by inserting it from below. The connector C1 is fixed to the connector attachment hole 22 at a first prescribed position by a prescribed mechanism so as to be detachable and not to be movable in the vertical direction relative to the connector attachment hole 22. In a state that the connector C1 is fixed to the connector attachment hole 22 at the first prescribed position, a top portion of the connector C1 projects from the top end of the side wall of the connector attachment hole 22.

Likewise, as shown in FIG. 3A, the connector C2 which is connected to the cable W2 is attached to the connector attachment hole 23 of the electronic unit attachment 20 by inserting it from below. The connector C2 is fixed to the connector attachment hole 23 at a second prescribed position by a prescribed mechanism so as to be detachable and to be movable in the vertical direction relative to the connector attachment hole 23. In a state that the connector C2 is fixed to the connector attachment hole 23 at the second prescribed position, a top portion of the connector C2 projects from the top end of the side wall of the connector attachment hole 23.

The expression "fixed (to the connector attachment hole 23) so as to be movable relative to" the connector attachment hole 23 may mean, for example, either that the connector C2 is fixed only by sliding frictional resistance between the outer surface of the connector C2 and the side wall of the connector attachment hole 23 or that the connector C2 is locked on the connector attachment hole 23 so as not to be movable relative to it by a lock mechanism having a unlocking mechanism capable of unlocking the connector C2.

In the state that the connectors C1 and C2 are attached to the electronic unit attachment 20, as shown in FIG. 3A the electronic unit 30 is inserted into the internal space of the electronic unit attachment 20 through the top opening of the body 21 of the electronic unit attachment 20. As the electronic unit 30 is inserted into the electronic unit attachment 20, the connector connection portions 33 and 34 come closer to the respective connectors C1 and C2.

As the electronic unit 30 is inserted into the electronic unit attachment 20, first, as shown in FIG. 3B, connection of the connector C2 to the connector connection portion 34 is completed. In the state that the connection of the connector C2 to the connector connection portion 34 is completed, the plural female terminals of the connector C2 are electrically connected to the plural respective male terminals 36 and the top surface of the connector C2 is in contact with the bottom surface of the connector connection portion (recessed portion) 34. At this stage, the connector C1 has not been connected to the connector connection portion 33 yet. In other words, a gap exists between the top surface of the connector C1 and the bottom surface of the connector connection portion 33 (see FIG. 3B).

Where the above lock mechanism having the unlocking mechanism is employed to fix the connector C2 to the connector attachment hole 23, the connector C2 is unlocked as soon as the connection of the connector C2 to the connector connection portion 34 is completed. The connector C2 is thereby rendered movable from the second prescribed position relative to the connector attachment hole 23.

When the electronic unit 30 is further inserted into the electronic unit attachment 20 after completion of the connection of the connector C2 to the connector connection portion 34, the top surface of the connector C2 is pushed by the bottom surface of the connector connection portion 34, whereby the connector C2 is moved relative to the electronic unit attachment 20 together with the electronic unit 30 while the state that the connection of the connector C2 to the connector connection portion 34 is completed is maintained. In other words, the connector C2 is moved downward away from the second prescribed position relative to the connector attachment hole 23.

When the insertion of the electronic unit 30 into the electronic unit attachment 20 is completed as shown in FIG. 3C, the connection of the connector C1 to the connector connection portion 33 is completed. In the state that the connection of the connector C1 to the connector connection portion 33 is completed, the single female terminal of the connector C1 is electrically connected to the single male terminal 35 and the top surface of the connector C1 is in contact with the bottom surface of the connector connection portion (recessed portion) 33. The state that the connection of the connector C2 to the connector connection portion 34 is completed is maintained.

As shown in FIG. 3C, when the insertion of the electronic unit 30 into the electronic unit attachment 20 is completed, the pair of lock projections 37 are engaged with the pair of lock nails 25 of the electronic unit attachment 20, respectively, whereby the electronic unit 30 is prevented from coming off the electronic unit attachment 20 and the state that the insertion of the electronic unit 30 into the electronic unit attachment 20 is completed is maintained. In this manner, the state that the connection of the connector C1 and the connector connection portion 33 is completed and the state that the connection of the connector C2 and the connector connection portion 33 is completed are maintained by the engagement of the pair of lock projections 37 and the pair of lock nails 25. When the insertion of the electronic unit 30 into the electronic unit attachment 20 is completed, the assembling of the electronic unit attaching structure according to the embodiment of the invention and the attachment of the connectors C1 and C2 to the electronic unit 30 are completed.

As described above, in the electronic unit attaching structure according to the embodiment, the two connectors C1 and C2 are attached to the electronic unit attachment 20 in advance. Connection of the two connectors C1 and C2 to the electronic unit 30 is completed by attaching the electronic unit 30 to the electronic unit attachment 20. As a result, the attaching work is easier than in the conventional attaching structure.

The two connectors C1 and C2 are connected to the electronic unit 30 with different timing. Thus, since the force that is required for connection of the connectors C1 and C2 is distributed in time, though the two connectors C1 and C2 are to be connected to the electronic unit 30, work of attaching the electronic unit 30 to the electronic unit attachment 20 can be made easier than in a case that the two connectors C1 and C2 are connected at the same time. Furthermore, since an event that too strong a force acts on the electronic unit 30 can be avoided, the semiconductor devices 32 provided in the electronic unit 30 can be prevented from failing due to such a force.

In the conventional attaching structure, since the electric wires lead out of the electric connection box (relay box), the electric wires need to be elongated accordingly, resulting in weight increase of the relay box. In contrast, in the attaching structure according to the embodiment, the electric wires need not be elongated for such a purpose, which contributes to weight reduction of an electric connection box that employs the attaching structure according to the embodiment as in the case of the electric connection box 10.

Other Embodiments

In addition, the invention is not limited to the aforementioned embodiments, but various modifications can be used within the scope of the invention. For example, the invention is not limited to the aforementioned embodiments, but changes, improvements, etc. can be made on the invention suitably. In addition, materials, shapes, dimensions, numbers, arrangement places, etc. of respective constituent elements in the aforementioned embodiments are not limited. Any materials, any shapes, any dimensions, any numbers, any arrangement places, etc. may be used as long as the invention can be attained.

For example, in the embodiment, the two connectors C1 and C2 are connected to the electronic unit 30. Alternatively, three or more connectors may be connected to the electronic unit 30. In this case, all of the three or more connectors may be connected to the electronic unit 30 with different timing. As a further alternative, two or more of them may be connected to the electronic unit 30 at the same time.

In the embodiment, the state that the connection of the connector C1 and the connector connection portion 33 is completed and the state that the connection of the connector C2 and the connector connection portion 34 is completed are maintained by the engagement between the pair of lock projections 37 and the pair of lock nails 25. In other words, an engagement mechanism for preventing only disengagement of the connector C1 from the connector connection portion 33 and an engagement mechanism for preventing only disengagement of the connector C2 from the connector connection portion 34 are not provided individually. Alternatively, such engagement mechanisms may be provided individually.

Features of the above-described electronic unit attaching structure according to the invention will now be summarized concisely below in the form of items [1] and [2]:

[1] An electronic unit attaching structure comprising:
an electronic unit (30) having a plurality of connector connection portions (33, 34); and an electronic unit attachment (20) having a plurality of connectors (C1, C2) correspond to the plurality of the connector connection portions,
the electronic unit attaching structure being configured to allow first connection and second connection in this order upon the electronic unit (30) being attached to the electronic unit attachment (20), the first connection being a connection of first part (C2) of the plurality of the connectors with first part (34) of the plurality of the connector connection portions, the second connection being a connection of second part (C1) of the plurality of the connectors with second part (33) of the plurality of the connector connection portions.

[2] The electronic unit attaching structure according to the item [1], wherein
the electronic unit attaching structure is used at a location where the electronic unit (30) is attached to an electric connection box (10) to which a plurality of electronic components (15, 16) are attached.

REFERENCE SIGNS LIST

10: Electric connection box
15: Relay (electronic component)
16: Fuse (electronic component)
20: Electronic unit attachment
30: Electronic unit
33: Connector connection portion
34: Connector connection portion
C1: Connector
C2: Connector

The invention claimed is:

1. An electronic unit attaching structure comprising:
an electronic unit having a plurality of connector connection portions; and an electronic unit attachment having a plurality of connectors correspond to the plurality of the connector connection portions,
the electronic unit attaching structure being configured to allow first connection and second connection in this order upon the electronic unit being attached to the electronic unit attachment, the first connection being a connection of first part of the plurality of the connectors with first part of the plurality of the connector connection portions, the second connection being a connection of second part of the plurality of the connectors with second part of the plurality of the connector connection portions, wherein
the electronic unit comprises a body, the body includes at least one semiconductor device and the plurality of connector connection portions, and
the at least one semiconductor device is configured to be electrically connected to the plurality of connectors via the plurality of connector connection portions.

2. The electronic unit attaching structure according to claim 1, wherein
the electronic unit attaching structure is used at a location where the electronic unit is attached to an electric connection box to which a plurality of electronic components are attached.

3. The electronic unit attaching structure according to claim 1, wherein
the electronic unit attachment comprises a body that includes the plurality of connectors, and
during the first connection and before the second connection occurs, the electronic unit is configured to press the first part of the plurality of the connectors such that the first part of the plurality of the connectors moves with the electronic unit in a direction relative to the body of the electronic unit attachment.

4. The electronic unit attaching structure according to claim 3, wherein
the body of the electronic unit is configured to be inserted into the body of the electronic unit attachment in the direction such that the first connection and the second connection occur.

* * * * *